United States Patent
Xu et al.

(10) Patent No.: US 9,224,323 B2
(45) Date of Patent: Dec. 29, 2015

(54) SYSTEMS AND METHODS FOR INCREASING SPATIAL OR TEMPORAL RESOLUTION FOR DUAL MODULATED DISPLAY SYSTEMS

(71) Applicant: Dolby Laboratories Licensing Corporation, San Francisco, CA (US)

(72) Inventors: Ning Xu, Irvine, CA (US); Gopal Erinjippurath, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 65 days.

(21) Appl. No.: 14/262,885

(22) Filed: Apr. 28, 2014

(65) Prior Publication Data

US 2014/0327710 A1    Nov. 6, 2014

Related U.S. Application Data

(60) Provisional application No. 61/820,122, filed on May 6, 2013.

(51) Int. Cl.
*G06T 3/40* (2006.01)
*G09G 3/20* (2006.01)
(Continued)

(52) U.S. Cl.
CPC .............. *G09G 3/003* (2013.01); *G06T 3/4053* (2013.01); *G09G 3/3426* (2013.01); *G09G 3/3648* (2013.01); *G09G 3/20* (2013.01); *G09G 2300/023* (2013.01); *G09G 2310/0235* (2013.01); *G09G 2320/0646* (2013.01)

(58) Field of Classification Search
CPC ......... G06T 3/4053; G09G 3/003; G09G 3/20
See application file for complete search history.

(56) References Cited

U.S. PATENT DOCUMENTS 6,384,816 B1    5/2002  Tabata
6,900,821 B2    5/2005  Goertzen
(Continued)

FOREIGN PATENT DOCUMENTS

CN    102368375    3/2012
EP    0790514      8/1997
JP    2007-241097  9/2007

OTHER PUBLICATIONS

Seetzen, H. et al "High Dynamic Range Display Systems", ACM Transactions on Graphics, Proc. of ACM Siggraph, vol. 23, Issue 3, pp. 760-768, Aug. 2004.

(Continued)

*Primary Examiner* — Fred Tzeng

(57) ABSTRACT

Dual modulation display systems comprising a first modulation layer and a second modulation layer are disclosed, such that the first modulation layer and the second modulation layer are offset by a desired distance. In one embodiment, the offset distance may be an actual spatial offset distance in one, two or a preferred direction. In another embodiment, the offset distance may be a rotational offset between the two layers. In yet another embodiment, the offset may be a temporal offset between the images appearing on the first modulation layer and the second modulation layer. In yet another embodiment, the offset may be a combination of spatial, rotational and/or temporal offsets. The display system may comprise a controller capable of mapping input image data onto the first and second modulation layers via intermediate signals and the intermediate signals may be some function of the offset.

20 Claims, 11 Drawing Sheets

(51) Int. Cl.
*G09G 3/00* (2006.01)
*G09G 3/34* (2006.01)
*G09G 3/36* (2006.01)

(56) References Cited

U.S. PATENT DOCUMENTS

| | | | |
|---|---|---|---|
| 6,963,319 B2 | 11/2005 | Pate | |
| 7,030,894 B2 | 4/2006 | Allen | |
| 7,301,549 B2 | 11/2007 | Damera-Venkata | |
| 7,407,295 B2 | 8/2008 | Damera-Venkata | |
| 7,419,267 B2 | 9/2008 | Whitehead | |
| 7,470,032 B2 | 12/2008 | Damera-Venkata | |
| 8,096,665 B2 | 1/2012 | Bellis | |
| 8,125,702 B2 | 2/2012 | Ward | |
| 8,687,147 B2 * | 4/2014 | Chao | F21V 11/00 349/68 |
| 8,736,643 B2 | 5/2014 | Messmer | |
| 8,736,674 B2 | 5/2014 | Hovanky | |
| 8,743,158 B2 | 6/2014 | Kang | |
| 2003/0071826 A1 | 4/2003 | Goertzen | |
| 2005/0104908 A1 | 5/2005 | Brown Elliott | |
| 2005/0225575 A1 | 10/2005 | Brown Elliott et al. | |
| 2006/0221304 A1 | 10/2006 | Damera-Venkata | |
| 2008/0158245 A1 | 7/2008 | Lieb | |
| 2008/0158641 A1 | 7/2008 | Lieb | |
| 2009/0091582 A1 | 4/2009 | Ajito | |
| 2009/0122089 A1 | 5/2009 | Aragaki | |
| 2009/0160757 A1 | 6/2009 | Robinson | |
| 2009/0174638 A1 | 7/2009 | Brown Elliott | |
| 2009/0284666 A1 | 11/2009 | Svardal | |
| 2010/0020933 A1 * | 1/2010 | Topfer | G06T 5/50 378/98.11 |
| 2010/0201719 A1 | 8/2010 | Kimura | |
| 2010/0214282 A1 | 8/2010 | Whitehead | |
| 2011/0050559 A1 | 3/2011 | Seetzen | |
| 2011/0249178 A1 | 10/2011 | Asano | |
| 2011/0273377 A1 | 11/2011 | Merz | |
| 2011/0279749 A1 | 11/2011 | Erinjippurath | |
| 2012/0007899 A1 | 1/2012 | Kuijpers | |
| 2012/0062607 A1 | 3/2012 | Erinjippurath | |
| 2012/0074851 A1 | 3/2012 | Erinjippurath | |
| 2012/0092360 A1 | 4/2012 | Kang | |
| 2012/0200593 A1 | 8/2012 | Todd | |
| 2013/0063496 A1 | 3/2013 | Basler | |
| 2013/0063573 A1 | 3/2013 | Erinjippurath | |
| 2013/0120678 A1 * | 5/2013 | Chao | F21K 9/50 349/34 |
| 2013/0342814 A1 | 12/2013 | Atkins | |
| 2014/0098886 A1 | 4/2014 | Crenshaw | |
| 2014/0125898 A1 * | 5/2014 | Chao | F21K 9/50 349/34 |

OTHER PUBLICATIONS

Wikipedia: Non-negative matrix factorization: http://en.wikipedia.org/wiki/Non-negative_matrix_factorization.
Blondel, V.D. et al "Weighted Nonnegative Matrix Factorization and Face Feature Extraction" Image and Vision Computing, 2008.
Liu, H. et al "Constrained Nonnegative Matrix Factorization for Imge Representation" IEEE Transactions on Pattern Analysis and Machine Intelligence, vol. 34, Issue 7, published in Jul. 2012, pp. 1299-1311.

* cited by examiner

SYSTEMS AND METHODS FOR INCREASING SPATIAL OR TEMPORAL RESOLUTION FOR DUAL MODULATED DISPLAY SYSTEMS

CROSS REFERENCE TO RELATED APPLICATIONS

This application claims benefit of priority to related, co-depending U.S. Provisional Patent Application No. 61/820,122 filed on May 6, 2013 entitled "Systems and Methods for Increasing Spatial or Temporal Resolution for Dual Modulated Display Systems" which is incorporated herein by reference in its entirety.

TECHNICAL FIELD

The present invention relates to displays systems and, more particularly, to methods and systems for enhancing resolution of display systems.

BACKGROUND

Over the last several decades, cinematic imagery and broadcast content workflows have increased in resolution. This has led to displays used for the consumption of artistic content and cinematic imagery having increased in size and resolution. With the cinematographers using cameras that can shoot upwards of 2K resolution, it is desirable to have displays capable of representing these resolutions. Today, several commercially available cameras fit this description—e.g., the Sony F65 shoots at 8K, the RED shoots at 5K and ARRI Alexa shoots at 3K. All these cameras are gearing towards capturing "true 4K" resolution motion imagery. At the NAB2012 Convention, multiple vendors including Canon demonstrated "4K workflows" which included 4K capture and 4K displays. At the same time, the emerging UHDTV standard outlines resolutions of 4K and 8K, with frame rate up to 120 fps. By contrast, most existing professional reference monitors and consumer displays are limited to 1920×1080 or Full HD resolution.

SUMMARY

Several embodiments of display systems and methods of their manufacture and use are herein disclosed.

Dual modulation display systems comprising a first modulation layer and a second modulation layer are disclosed, such that the first modulation layer and the second modulation layer are offset by a desired distance. In one embodiment, the offset distance may be an actual spatial offset distance in one, two or a preferred direction. In another embodiment, the offset distance may be a rotational offset between the two layers. In yet another embodiment, the offset may be a temporal offset between the images appearing on the first modulation layer and the second modulation layer. In yet another embodiment, the offset may be a combination of spatial, rotational and/or temporal offsets. The display system may comprise a controller capable of mapping input image data onto the first and second modulation layers via intermediate signals and the intermediate signals may be some function of the offset.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1A:
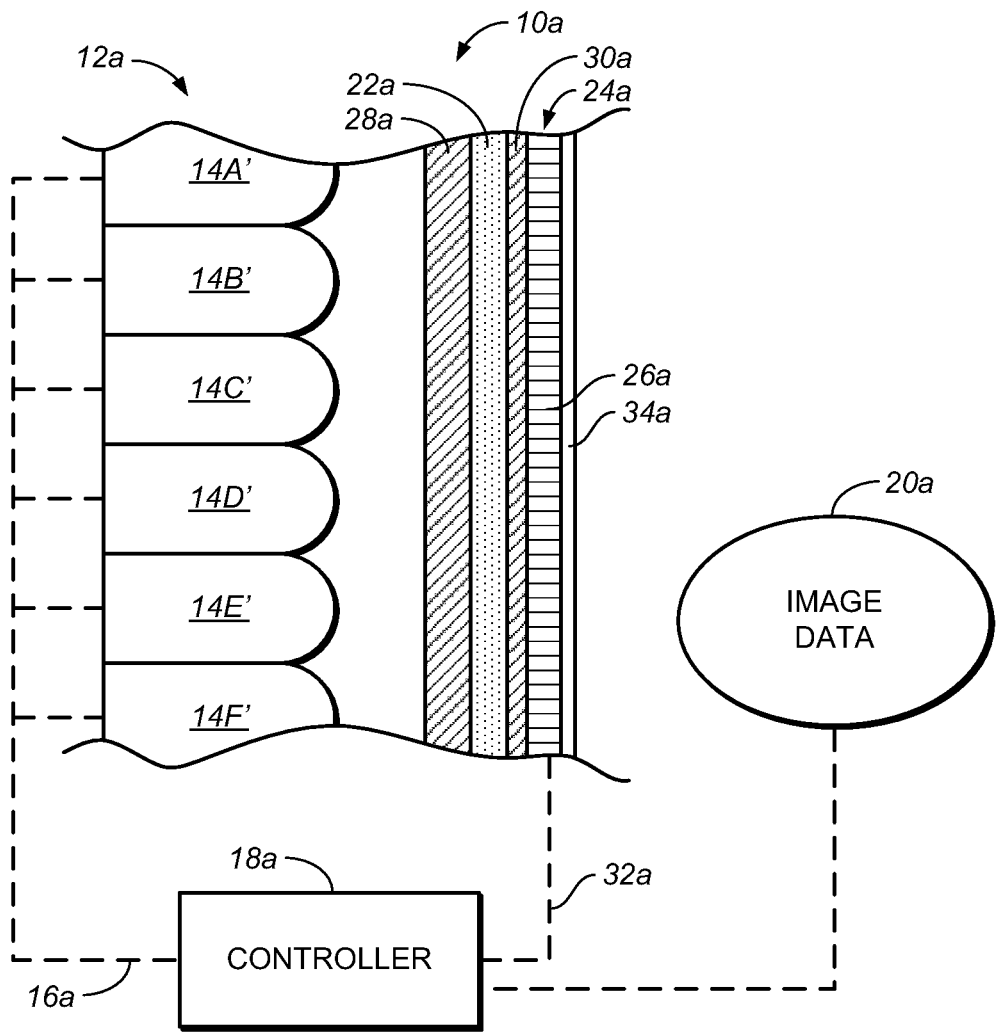
FIGS. 1A through 1C are exemplary embodiments of dual modulation display system that may be suitable for the systems, methods and techniques of the present application disclosed herein.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

As mentioned above, most existing professional reference monitors and consumer displays are limited to 60 fps (frames per second) Full HD resolution.

However, novel high resolution HDR displays, like those comprising dual modulator panels (as described herein), have the possibilities of displaying images of high dynamic ranges at high spatial resolutions. In many embodiments disclosed herein, display systems are disclosed comprising dual modulation systems that tend to generate not only higher spatial resolutions; but also high temporal resolution in their display capability. These embodiments may be used to provide displays with an effective spatial or temporal resolution that is greater than either of the individual modulators.

Dual Modulation Display System Embodiments

As mentioned above, several embodiments of present application may comprise display system further comprising the use of two or more modulators. Thus, the word "dual" may, in some instances, mean two modulators—or it may mean more than two modulators. Dual modulation display systems may be implemented in a number of manners and/or techniques. For example, some dual modulators may comprise an array and/or set of individually addressable backlights (e.g., LED, OLED, CCFL, etc.) and one (or more) front modulator(s) (e.g., LCD or other addressable modulator). Another dual modulator may comprise two (or more) LCD modulators that may be illuminated by a backlight (e.g., locally dimmable or not, backlit or edge-lit). Another dual modulator may comprise two (or more) digital projectors.

Various systems, techniques and/or technologies involving the afore-mentioned different dual modulation display systems may be found in the following co-owned patent applications:

(1) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION";

(2) United States Patent Application 20120062607 to Erinjippurath et al., published on Mar. 15, 2012 and entitled "METHOD AND APPARATUS FOR EDGE LIT DISPLAYS";

(3) United States Patent Application 20120075435 to Hovanky et al., published on Mar. 29, 2012 and entitled "METHOD AND SYSTEM FOR 3D DISPLAY CALIBRATION WITH FEEDBACK DETERMINED BY A CAMERA DEVICE";

(4) United States Patent Application 20130063573 to Erinjippurath, published on Mar. 14, 2013 and entitled "HIGH DYNAMIC RANGE DISPLAYS HAVING IMPROVED FIELD SEQUENTIAL PROCESSING";

(5) United States Patent Application 20130063496 to Basler et al., published on Mar. 14, 2013 and entitled "HIGH DYNAMIC RANGE DISPLAYS COMPRISING MEMS/IMOD COMPONENTS";

(6) U.S. Pat. No. 7,419,267 to Whitehead et al., issued on Sep. 2, 2008 and entitled "HDR DISPLAYS WITH OVERLAPPING DUAL MODULATION".

(7) United States Patent Application 20120306943 to Messmer, published on Dec. 6, 2012 and entitled "METHODS AND SYSTEMS FOR REDUCING POWER CONSUMPTION IN DUAL MODULATION DISPLAYS"; and (8) United States Patent Application 20120092360 to Kang et al., published on Apr. 19, 2012 and entitled "DUAL MODULATION USING CONCURRENT PORTIONS OF LUMINANCE PATTERNS IN TEMPORAL FIELDS";

(9) United States Patent Application 20100214282 to Whitehead et al., published on Aug. 26, 2010 and entitled "APPARATUS FOR PROVIDING LIGHT SOURCE MODULATION IN DUAL MODULATOR DISPLAYS"; and

(10) U.S. Pat. No. 8,125,702 to Ward et al., issued on Feb. 28, 2012 and entitled "SERIAL MODULATION DISPLAY HAVING BINARY LIGHT MODULATION STAGE";

all of which are hereby incorporated by reference in their entirety.

Figure 1B:
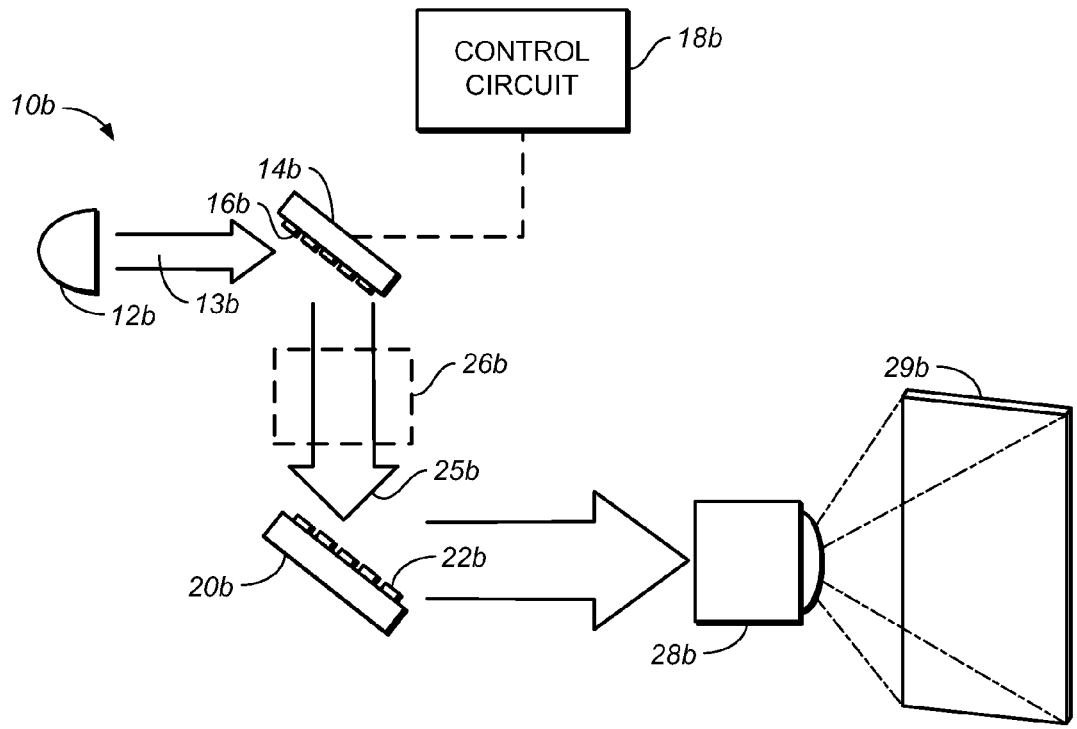
Figure 1C:
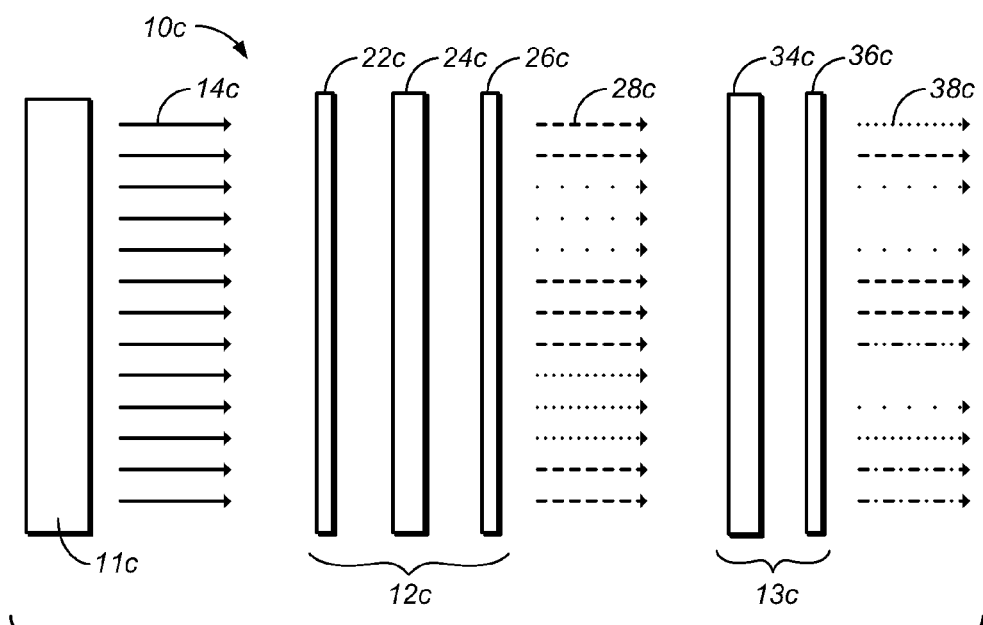

FIGS. 1A through 1C are exemplary embodiments of dual modulation display system that may be suitable for the systems, methods and techniques of the present application disclosed herein.

FIG. 1A is one embodiment, showing a partial cross-sectional diagram of a dual modulator display $10a$ according to a particular embodiment. Display $10a$ may be similar in many respects to the displays disclosed in the Dual Modulator Display Applications. Display $10a$ may comprise an optional phosphorescent plate $22a$ located in the optical path between light source modulation layer $12a$ and display modulation layer $24a$. Phosphorescent plate $22a$ comprises one or more phosphorescent materials which are energized by spatially modulated light received from light source modulation layer $12a$. Phosphorescent plate $22a$ in turn provides spatially modulated light to display modulation layer $24a$. Display modulator $24a$ (e.g., LCD panel—colored or monochrome) modulates the light to provide the output of display $10a$. In one embodiment, the spatial modulation provided by display modulation layer $24a$ may have a higher resolution than the spatial modulation provided by light source modulation layer $12a$, although this is not necessary.

Display $10a$ comprises a controller $18a$. Controller $18a$ may comprise any combination of hardware and software capable of operating as described herein. By way of non-limiting example, controller $18a$ may comprise one or more suitably programmed data processors, hard-wired or configurable logic elements, memory and interface hardware and/or software. The data processors of controller $18a$ may comprise one or more programmable computers, one or more embedded processors or the like. Controller $18a$ may control the operation of light source modulation layer $12a$ using drive signals $16a$ and display modulation layer $24a$ using drive signals $32a$.

In the illustrated embodiment, light source modulation layer $12a$ is implemented by an array of individually addressable LEDs $14A'$, $14B'$, $14C'$, $14D'$, $14E'$, $14F'$ (collectively, LEDs $14'$). In other embodiments, LEDs $14'$ may be replaced with or supplemented with lasers. As described in the Dual Modulator Display Applications, light source modulator $12a$ may be implemented using other components. By way of non-limiting example, light source modulator $12a$ may be implemented by: an array of controllable light sources of a type different than LEDs; one or more light sources and a light modulator disposed to spatially modulate the intensity of the light from the one or more light sources; and some combination of these.

FIG. 1B is another embodiment of a possibly suitable dual modulating display system, comprising two or more digital projectors. FIG. 1B shows a monochrome display 10b according to this example embodiment. Display 10b comprises a light source 12b. Light 13b from light source 12b illuminates a first spatial light modulator 14b. Light source 12b may comprise, for example: a laser; a xenon lamp; an array of laser diodes or other solid-state light emitters; an arc lamp; or the like.

First spatial light modulator 14b may comprise a plurality of controllable elements 16b. Elements 16b can be switched between ON and OFF states by a suitable control circuit 18b. When it is in its ON state, an element 16b allows incident light 13b that hits the element to pass to a corresponding area of a second spatial light modulator 20b. When it is in its OFF state, the amount of light that passes from the element 16b to the corresponding area of the second spatial light modulator 20b is diminished. Ideally, when an element 16b is in its OFF state, substantially no light from the element 16b reaches the corresponding area of the second spatial light modulator 20b.

First spatial light modulator 14b may be implemented in a wide variety of ways. First spatial light modulator 14b comprises a DMD in some embodiments. In other embodiments, first spatial light modulator 14b comprises an array of optical reflective or transmissive elements that can be switched between ON and OFF states by other mechanisms. For example, in some embodiments, first spatial light modulator 14b comprises an LCD panel. LCOS chip or the like. In other embodiments, the functions of light source 12b and first spatial light modulator 14b are combined. In such embodiments, first spatial light modulator 14b may comprise an array of light sources such as lasers that can be switched on or turned off (or otherwise switched between light-emitting and dark states).

Second spatial light modulator 20b comprises a plurality of controllable elements 22b. Each controllable element 22b can be controlled to select a proportion of the light 25b that is incident on the element 22b from first spatial light modulator 14b that is transmitted to a viewing area. Second spatial light modulator 22b may be provided by any suitable technology, such as, for example: a liquid crystal display (LCD) panel; a liquid crystal on silicon LCOS chip; a micro-mirror array; magneto-optic devices; light valves; etc.

In some embodiments, second spatial light modulator 20b comprises optical reflective or transmissive elements that can be switched between ON and OFF states. In such embodiments, second spatial light modulator 20b may be controlled by a controller that sets its elements to be ON or OFF. In some embodiments, first spatial light modulator 14b and second spatial light modulator 20b each comprise a DMD or other two-dimensional array of controllable micro-minors. Such embodiments have the advantage that DMDs can be sourced relatively inexpensively and there is currently a wide range of support for the design and manufacture of devices which incorporate DMDs.

Transfer optics 26b carry light 25b from first spatial light modulator 14b to second spatial light modulator 20b. Light 25b is capable of illuminating the entire active area of second light modulator 20b when all elements 16b of first spatial light modulator 14b are ON. Light 25b could spread past the edges of second spatial light modulator 20b. Transfer optics 26b blur light 25b. Transfer optics 26b may be characterized by a transfer function which at least approximates how light 25b issuing from a point on first spatial light modulator 14b will be spread over second spatial light modulator 20b. The pattern of light incident on second light modulator 20b can be estimated or determined from the configuration of first modulator 14b (i.e. from which elements 16b are ON and which elements 16b are OFF) and the transfer function. Where display 10b is a projection-type display, a suitable projection lens 28b focuses light from second spatial light modulator 20b onto a screen 29b for viewing. Screen 29b may comprise a front-projection screen or a rear-projection screen.

In some embodiments, a projector may comprise a light source configured to illuminate a first reflective modulator, which may be configured to modulate light from the light source and illuminate a second reflective modulator. The first reflective modulator is optically offset from said second reflective modulator. The projector may further comprise a controller configured to receive input image data and send intermediate signals to said first modulation layer and said second modulation layer based on an amount of said offset.

The first and second modulator may be replicated for each of a series of color channels within the projector such that each color channel includes 2 optically offset reflective modulators. The series of color channels may comprise a red channel, a green channel, and a blue channel. The light source may comprise, for example, a plurality of laser light sources. The light sources may be modulated either globally (in brightness) and/or spatially (locally dimmed). Image data used to energize the modulators (and/or modulate the light sources) may be image data based on 3D imagery. The intermediate signals to the second modulator may be, for example, based on a light field simulation comprising a point spread function of light reflected by the first modulator and the offset. For example, the intermediate signals to the second modulator may be based on a point spread function of light reflected by the first modulator in each channel and the offset in each channel. The offset in the channels may be the same, or the offset of at least two channels is different and the intermediate signals to second modulator in each channel is based on at least one of the offset and differences in offset between channels.

FIG. 1C is yet another embodiment of a possibly suitable dual modulating display system, comprising two or more addressable panels. The display 10c includes a backlight 11c which may be a standard CCFL or other broadband lighting source (e.g., LEDs, OLEDs, etc.). In addition, the backlight may be direct lit (light source(s) directly illuminating downstream modulation panels) or edge lit (as is popular in many thin screen LCD display designs). Further yet, the backlight may be constant, globally dimmed, or locally dimmed. The light source for this display can be white, controllable luminance, or multiple colors driven.

The backlight 11c illuminates downstream modulators, including, in this example, an LCD panel 12c which modulates the backlight in intensity and color. A controllable polarizer (or contrast-improving panel) 13c further modulates the light as to polarity (and which may then be attenuated by a polarization layer to effect an intensity modulation of the output light).

The LCD panel 12c is constructed to include an initial polarizing layer 22c, which may be for example, any of a reflective polarizer, an absorptive polarizer, or a polarization converter, or another device that provides an initial uniform polarization orientation from which downstream modulations are to be based. Preferably, the initial polarizing layer 22c is a reflective polarizer so that light that the reflected light may be "re-cycled" by reflection into and then back out of the optical cavity of the backlight 11c. An active layer 24c comprises liquid crystals (e.g., twisted nematic) and color filters (e.g., typically RGB). The liquid crystals are oriented based on an energization of the active layer intended to rotate or change polarization of light passing through the filters. A passive polarization analyzer 26c, which may be, for example, an absorptive polarizing layer that filters out (or passes) light of a predefined polarization as changed by the liquid crystals.

The controllable polarizer (contrast-improving panel) 13c, may be, for example, the active elements of an LCD panel (e.g., a TN layer) combined with a passive polarizer (e.g., active layer, or active elements 34c and passive polarizer 36c). The controllable polarizer 30c may be, for example, an LCD panel without color filters. As shown, the initial polarizer of this second LCD panel may be removed, relying, in this specific case, on the passive polarizing analyzer 26c for an initial uniform polarization.

In the case of a constant backlight, the backlight 11c produces an initial light 12c which is constant or uniform. In other embodiments, the initial light 12c may be modulated, e.g., any of spatially modulated light, pre-modulated light, globally dimmed light, individual RGB dimmed, temporally modulated light, or others, and/or a combination of the above. The initial light 12c illuminates the first downstream modulator (note that additional optical elements may be placed at virtually any point in the light/image chain, including any of diffusers, collimators, DEV, Brightness Enhancement Films (BEFs), etc.). Other optical elements including reflectors may also be utilized depending on the design (e.g., side lit display designs may utilize, for example, a reflector/diffuser combination to redirect and diffuse light from a side light path that is mainly parallel to a display screen to a light path that is mainly perpendicular to the display screen.

The image-generating panel 12c modulates the initial light 14c in a manner that is physically similar to a standard LCD display. The energization of the image-generating panel 12c is calculated to accommodate the design and use of the controllable polarizer 13c and is discussed in more detail further below. 1st modulated light 28c is emitted from the image-generating panel 12c and illuminates the contrast-improving panel 13c.

The contrast-improving panel 13c further modulates the $1^{st}$ modulated light 28c in a manner that increases the contrast and, for example, resolution of the modulated light, resulting in a $2^{nd}$ modulated light, or, in this case, better described as final image light 38c. The increased resolution results, for example, when the contrast-improving panel 13c has more pixels for a given area than the image-generating panel 12c.

Increased spatial resolution may also result when the active elements 34c are of similar/same construction as active elements of the image-generating panel 12c (e.g., LCD panel 12c and contrast-improving panel 13c are the same except that the contrast-improving panel 13c has the color filters removed). Benefits may also be obtained when the pixels of the contrast-improving panel are of a different shape, offset, size (e.g., smaller or larger), orientation (e.g., 0, 45, or 90 degrees), or layout compared to the image-generating panel.

The active elements 34c rotate polarization of individual "pixels" of the $1^{st}$ modulated light 28c based on a desired local dimming effect. Pixels in quotations because the pixels of first modulated light 28c may be different from pixels of the active elements 34c. In the case where a design utilizes an LCD panel (e.g., LCD panel 12c) having active elements that are the same as active elements 34c, the pixels of the active elements 34c are still different from the pixels of the LCD panel 12c because the pixels of the LCD panel 12c each include three active elements (one for each Red, Green, and Blue filter that forms each LCD pixel), where each element of the active elements 34c may be defined as a single pixel.

The active elements 34c further modulate the $1^{st}$ modulated light 28c on a pixel-by-pixel basis via the pixels of the active elements 34c by imposing a prescribed amount of polarization rotation. The modulation is then effected by passive polarizer 36c that absorbs amounts of light proportional to the light's difference in polarization as modulated upstream. The contrast-improving panel 13c is shown downstream from the image-generating panel, but may be placed upstream of the image-generating panel.

As mentioned, each of the afore-mentioned embodiments (as well as other embodiments) of dual modulation display systems may suffice for the systems, methods and techniques of the present application.

Embodiments Comprising Enhanced Spatio-Temporal Resolution

Figure 2:
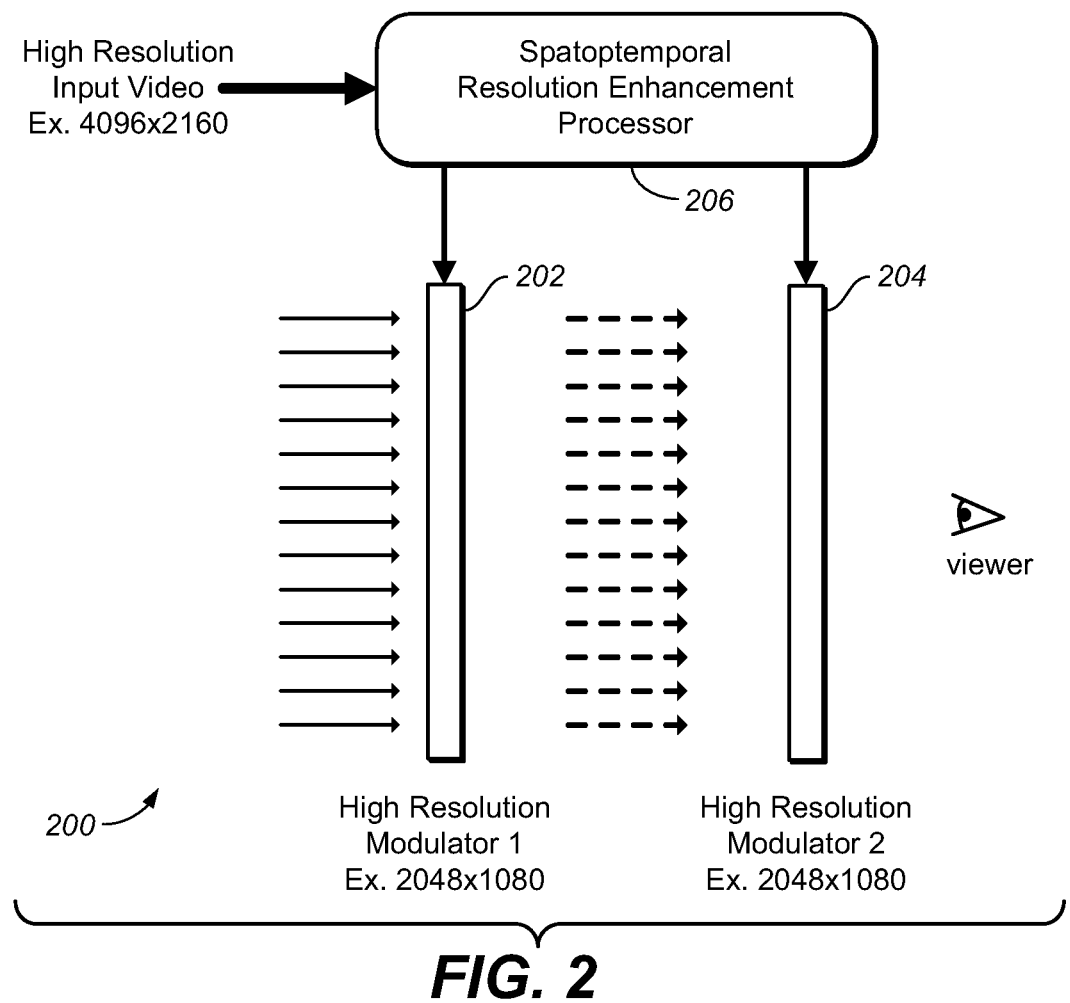
FIG. 2 gives one embodiment of a display system as made in accordance with the principles of the present application.

FIG. 2 gives one embodiment of a display system as made in accordance with the principles of the present application. Display system 200 may comprise a first high resolution modulator 202, a second high resolution modulator 204 and a processor/controller 206. It should be appreciated that, although FIG. 2 depicts the two modulators as panel, the two modulators may be an addressable backlight/one addressable panel, two digital projectors/DMDs or two addressable panels. The techniques disclosed herein may be suitably modified to work with any such dual modulation display system known.

However the two modulators may be constructed, one modulator may comprise a rear (or first) layer and the second modulator may comprise a front (or second) layer. The first layer may transmit a first modulated light (e.g., in any mode possible—emissive and/or transmissive) to the second layer that may transmit a second modulated light (e.g., perhaps to a viewer of the image from the display system). As discussed in greater detail below, the first layer and the second layer may be displaced from each other by a known and/or desired offset (i.e., a first distance). In some embodiments, this offset may be an actual spatial distance in a given direction—or any direction desired (e.g., in one dimensions, in two directions, along some diagonal direction, etc.). In other embodiments, the offset may be an actual temporal distance—e.g., a time difference between related image data that may appear first on the rear (or first) layer and then on the front (or second) layer. In yet other embodiments, the offset may be a combination of spatial and temporal distance.

Processor/controller 206 may input image data to be finally rendered by the dual modulator display system. As discussed further herein, the controller may map this input image data to a set of intermediate signals to drive the first and second modulator/layers. The intermediate signal may comprise both image data and control signals for each of the first and second layers. In one embodiment, the controller may be aware (in any fashion known in the art—e.g., LUT, ROM, RAM or the like) of the offset (either spatial, temporal and/or spatial/temporal) of which the display system is capable. As discussed in greater detail herein, the controller may make the intermediate signals as some function of the offset—e.g., in order to create desired final rendered image. It should be appreciated that such a function may take into consideration any spatial offset that is built into the dual modulator display system or any desired (possibly dynamic) temporal offset desired to render the final image.

As may also be seen, processor 206 may be capable of receiving high resolution image/video data (e.g., 4096×2160, 4K resolution, 8K resolution or the like). In the exemplary case of 4096×2160 input image data, then in one embodiment, processor 206 may drive first and second high resolution modulators with a resolution, such as 2048×1080. In general, the final resolution of the display system may comprise a function of the resolutions of the first and second high resolution modulators. It should be appreciated that first and second high resolution modulators may have the same resolution—or they may have different resolutions.

In another embodiment, processor 206 may be capable of receiving low resolution image/video data and performing some form of super resolution processing and/or subpixel rendering processing on such low resolution data and render it on the dual modulator display system at a higher resolution than the input image/video data. Such subpixel rendering processing and related algorithms (e.g., interpolation, sampling, filtering, etc.) are well known in the art—and any suitable algorithm is possible in the present system. In some embodiments, it may be possible to sample the input image data and/or associated metadata to dynamically understand the resolution of the input image data. The controller may then make any dynamic decisions and/or processing to render the input image data onto a desired final image rendered on the display system. The controller may map the input image data onto such intermediate signals for the first and second layers, as a desired function of any spatial and/or temporal offset.

In another embodiment, dual modulated display system may comprise of a rear layer of LED light sources and a front layer of LCD panel. In such embodiment, it is possible that these two layers comprise different resolutions, e.g., with the backlight layer having reduced resolution. In some cases, full resolution LED backlight arrays may be used.

In yet another embodiment, the display system may apply spatial and temporal resolution enhancements on a dual modulated display by dynamically determining which enhancement (e.g., spatial or temporal) is possibly more important psychophysically based on the image content, and apply enhanced spatial or temporal resolution accordingly. Such a dynamic determination is disclosed in co-owned:

(1) International Application Publication Number WO2012/166512 to Crenshaw et al., published on Dec. 6, 2012 and entitled "VIDEO COMPRESSION IMPLEMENTING RESOLUTION TRADEOFFS AND OPTIMIZATION";

and is hereby incorporated by reference herein in its entirety.

One Processing Embodiment

Figure 3A:
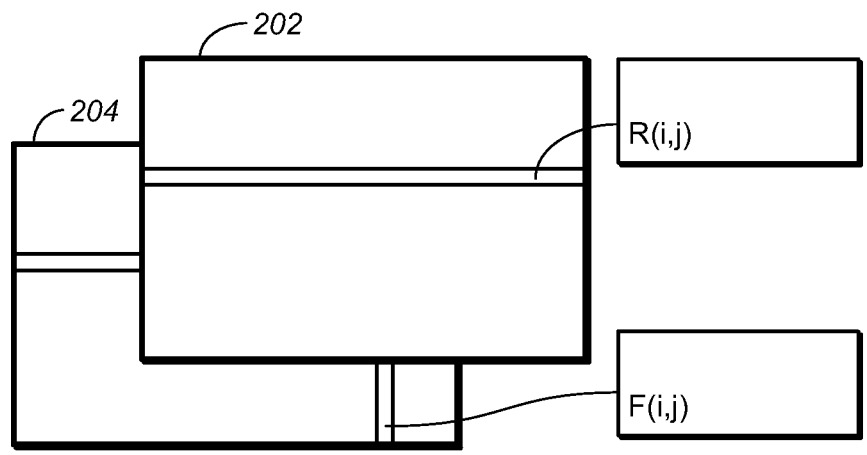
FIGS. 3A and 3B depict two modulators comprising a substantially same aligned spatial and temporal resolution.

Turning attention to FIG. 3A, there is shown two modulators (e.g., 202 and 204) that have the same aligned spatial and temporal resolution—e.g., the LED layer contains a light emitting pixel R(i,j) at location (i,j) and the LCD Layer contains a corresponding masking pixel F(i,j) at the same location. The light coming from the LED pixel R(i,j) is then modulated by the LCD pixel F(i,j) and yield an intensity I(i,j) which is the product of R(i,j) and F(i,j). i.e., I(i,j)=R(i,j)*F(i,j).

Figure 3B:
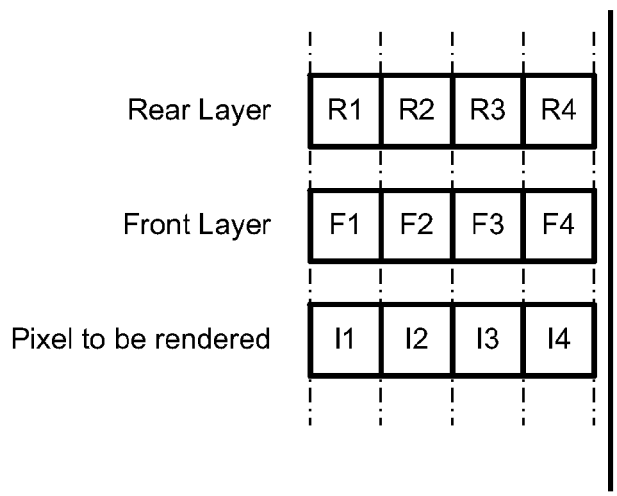

FIG. 3B depicts more detailed pixels in the one dimension case. As may be seen in FIG. 3B, with rear LED layer pixel value Ri and front LCD layer pixel value Fi, the combined pixel value would be $I_i$=Ri*Fi, i=1, 2, 3, and 4. In this example, it is possible to define the pixel value range as [0,1], for all the rear pixels, front pixels, and final rendered pixels. In one embodiment, it is possible to render a pixel with value Ii in a number of ways with more than one choices of how to put Ri and Fi, so that the final output is $I_i$. Given this, it may be possible with a dual modulation display system to apply some low pass filtering on the back layer in order to reduce the aliasing and Moire effects.

On the other hand, considering only integer pixel values—for example, if both rear and front layer have 8 bit depth—the resulting pixel values may not cover the entire integer values within 16 bit dynamic range. For example, consider the case of 1 bit or 2 bit individual layers. If both layers contains only 1 bit, the final resulting pixels will only take the values of [0,1] so it is still 1 bit. If both layers contains 2 bit, i.e., [0, 1, 2, 3], the final resulting pixels can be [0, 1, 2, 3, 4, 6, 9], which is only 7 different levels and much less than the expected 16 levels.

With the above said, the dual modulation scheme enables the final resulting pixel Ii be rendered at a higher dynamic range than the dynamic range of either the rear LED layer or the front LCD layer individually.

Increasing Spatial Resolution for Dual Modulated Display

Figure 4:
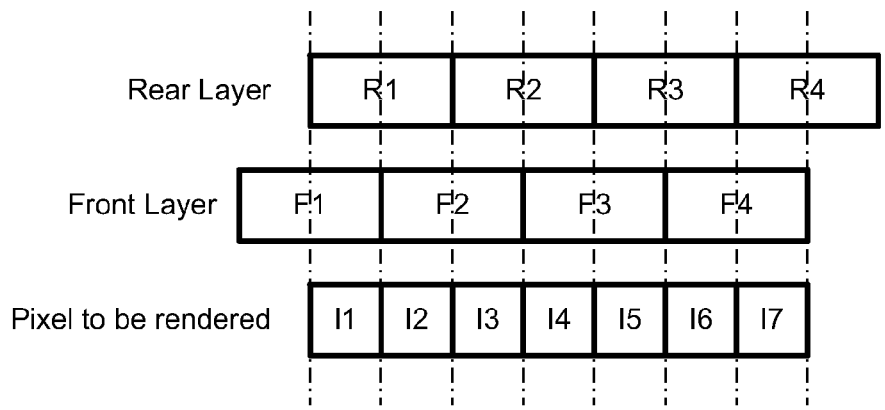
FIG. 4 depicts a dual modulation display system with the front layer and back layer offset by desired amount.

Turning attention to FIG. 4, with dual modulation, the front layer and back layer may be offset by half pixel (or some other fractional amount) in order to increase the spatial resolution for the final rendered results. To simplify the description, it may be assumed that both layers (i.e. rear and front layers) comprise a luminance channel. In such a case, it may be possible to not consider the color strips within the LCD panel. Here it is possible to describe the simplest case where only one dimensional offset is allowed and also the offset is half pixel. It should be appreciated that the techniques described herein would be extendable to other offset and both directions. In the simple case, can be illustrated as in the following figure:

There are references to exploring offsetting two layers of image data to yield higher resolution in the literature. For example, the following are representative:

(1) United States Patent Application 2005104908 to Brown Elliott, published on May 19, 2005 and entitled "COLOR DISPLAY PIXEL ARRANGEMENTS AND ADDRESSING";

(2) United States Patent Application 2003071826 to Goertzen, published on Apr. 17, 2003 and entitled "SYSTEM AND METHOD FOR OPTIMIZING IMAGE RESOLUTION USING PIXELATED IMAGING DEVICE";

(3) United States Patent Application 20090091582 to Ajito et al., published on Apr. 9, 2009 and entitled "MULTI-PRIMARY COLOR DISPLAY METHOD AND DEVICE";

(4) United States Patent Application 20080158245 to Lieb et al., published on Jul. 3, 2008 and entitled "HIGH DYNAMIC RANGE DISPLAY SYSTEMS"

all of which are incorporated by reference in their entirety.

In many embodiments of the present application, it may be desirable to solve this kind of offset dual modulation problem by finding an optimal solution targeting at each individual output pixel. In addition, it may be possible to extend it to temporal dimension in order to obtain a higher frame rate dual modulation display, as discussed further herein.

Embodiments in One Dimensional Cases

Taking the one dimensional case as shown in FIG. 4 as one merely example, the width of the pixel to be rendered may be approximately half the width of the pixels in rear and front layers—while the pixels in both layers may have the same width but are aligned with half pixel distance. Therefore, one rear pixel, e.g. R1, is covered by two front pixels—e.g., right half of F1 and left half of F2. Consequently, pixels I1 and i2 to be rendered may take the form:

$$I1=\tfrac{1}{2}R1*F1; I2=\tfrac{1}{2}R1*F2$$

Figure 5:
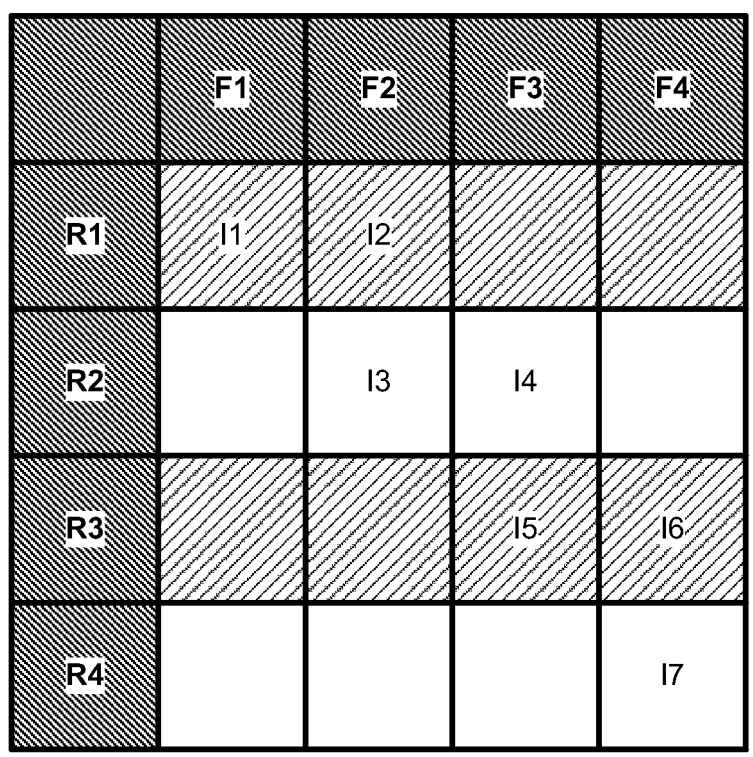
FIG. 5 depicts one embodiment of a mapping of image data for first and second modulators for a spatial offset.

The relationship of the pixel values are depicted in FIG. 5—where the first row shows the front pixels, and first column shows the real pixels, and two diagonal strips in the table show the pixels to be rendered.

It should be appreciated that the vacant table entries may be any number and/or values. It is possible to construe FIG. 5 as a matrix I, and denote the pixel values at the rear layer as a vector R, the pixel values at front layer as a vector F. The matrix I can therefore be expressed as I=½R*F'.

It may be desirable to find out R and F, and make the corresponding part of I as the desired pixel values, Ii. In one embodiment, this may be treated as a minimization problem: [R, F]=arg min (‖I−½R*F'‖2), in which it is desirable to find R and F that minimize the difference between I and ½ R*F'. One solution may be to define I in the following manner: the two diagonal strips of the matrix may be defined by the output image values, and the other entries can be anything. Without loss of generality, it may be possible to define all these values as 0. However, the assignment of these not-defined entries may affect the solution of the minimization problem; therefore, it may be desirable to find another, suitable assignments for these entries.

In one embodiment, it may be possible to consider the not-defined entries as follows. For example, considering the entry that equals ½ F1*R2, it may have neighboring defined pixels I1, I2, and I3. In such a case, it may be the following:

$$I1=½F1*R1,$$

$$I2=½F2*R1,$$

$$I3=½F2*R2,$$

Then in this case, it may be possible to solve for this entry and get:

$$½F1*R2=I1*(I3/I2).$$

As it may be desirable to avoid the problem of dividing by zero, it may be possible to add a small offset to the pixel values that are smaller than a threshold, e.g., raise a crush intensity to a non-zero value. Following the above scheme, it may be possible to define the pixel values for all the neighboring entries of the defined ones in matrix I. Repeating this procedure tends to yield a fully defined matrix I.

After matrix I is defined, R and F may be estimated using non-negative matrix factorization, as known in the art. This estimation may tend to minimize the Euclidean distance between R*F' and I.

In many embodiments, the system may not care much about undefined entries in I, and it may be possible, therefore, to attach a weight matrix W to the optimization scheme, and solve the following problem:

$$[R,F]=\arg\min(W\cdot*\sim(I-½R*F')\|^2),$$

where W may have big value (e.g. 1) for the entries corresponding to the desired pixel values and small value (e.g. 0) elsewhere, and operator ".*" represents entry-by-entry multiplication.

The weight may be put in other ways, so pixels may be treated with different importance regarding the reconstruction errors. For example, for areas of the image where viewers would likely put more attention ("saliency area"), it may have a higher weight. Such saliency areas may be determined or otherwise detected by saliency detection methods, or some object detection methods—e.g., face detection, skin tone detection. In some embodiments, iterative methods may be used to estimate R and F—although exact results may be hard to achieve for all cases.

For merely one example, if I1, I3, and I5 are very bright but I2, I4, and I6 are very dark, it may be difficult to obtain an R and F that yield small errors on those pixels. However, in one embodiment, it may be assumed that the two sides of a sharp edge would be large enough—for example, if I1 is light and I2 is dark, the pixels left to I1 would also be light and the pixels right to I2 would also be dark. In such a case, it may be possible to assign F1 light and F2 dark and find an R1 to render I1 and I2 well. If the sharp edge is between I2 and I3, for instance, I2 is light and I3 is dark, it may be possible to assign R1 light and R2 dark so that an F2 can be found to render I2 and I3. Those assignments may be found through the iterative optimization of the cost function.

The above method may be applied either horizontally or vertically to increase the horizontal and vertical resolution, respectively. In the usual case of vertical strips of RGB color elements, this method may be used to increase the vertical resolution of the display. Overall, the method for using dual modulation to increase spatial resolution can be described as:

1. For given input image and the direction where the pixels are displaced by half pixel:
2. For each row or column in that direction:
    a. Reorganize the 1D array as a 2D sparse matrix as shown in FIG. 5;
    b. Optionally, calculate pixel values for the elements without value;
    c. Assign weights to each element of the matrix;
    d. Use non-negative matrix factorization to find out front and rear arrays.
3. Packing front arrays into front image.
4. Packing rear arrays into rear image.

Two Dimensional Cases:

The most common two dimensional case would be that front and rear layers being positioned at half pixel offset both horizontally and vertically. If it is defined such that the front layer image is F(i,j) and real layer image is R(i,j), with: 1≥i≥M, 1≥j≥N, then the image to be rendered is I(x,y) with 1≥x≥2*M−1, and 1≥y≥2*N−1.

It may be possible to first establish the correspondence between pixel values of I and pixel values of R and F as follows:

$$I(2i-1,2j-1)=¼R(i,j)*F(i,j);$$

$$I(2i-1,2j)=¼R(i,j+1)*F(i,j);$$

$$I(2i,2j-1)=¼R(i+1,j)*F(i,j);$$

$$I(2i,2j)=¼R(i+1,j+1)*F(i,j);$$

After this correspondence is calculated, it may be possible to reshape the real and front image R and F into one dimensional vectors as RR and FF, where each vector comprises substantially the same number of pixels as in the image, e.g., RR and FF may have a dimension of MN−1. This may be represented as row first order, or column first order, or any other order. A matrix II may then be constructed, with the corresponding entries from image I. The entries that have no definition may be inferred from its neighboring entries. Also since the values at these places are not important, it may be possible to use other methods to obtain the value—e.g., for example, using nearest available values or a function defined on its neighboring available values.

With the entries defined, it is possible to construct a weight matrix W, which contains big weights for those defined entries and small weights for those undefined ones, and then solve the following problem:

$$[RR,FF]=\arg\min(W\cdot\|(II-¼RR*FF')\|^2),$$

With the minimizing solution RR and FF, it is possible to reshape them back into two dimensional R and F. With a standard size image, the dimension of II may be large. For example, a 1080p image may result in II with dimension of roughly 2 million by 2 million. This may be too big to fit in memory for the optimization problem. In one embodiment, in order to reduce the complexity of the optimization problem, it is possible to deploy a divide and conquer scheme, by dividing the image into smaller blocks and solve the optimization problem for each blocks individually.

Divide and Conquer for Two Dimensional Case

In one embodiment, the output image may be divided into smaller blocks, and it may be possible to solve the optimization problem defined earlier for the front and rear layer pixel values for small blocks. In one further embodiment, the first block to be solved may comprise the same optimization problem to solve, while the following blocks may be solved by an optimization problem with some boundary constraints. In some cases, some blocks may have one side edge with determined values by the previous optimization solution—while the others may have two side edges with determined values by previous solutions. In other embodiments, these constrained optimization problems may be solvable with different techniques—e.g., for example, using constrained non-negative matrix factorization.

Shadow Mask of Pixels

In several embodiments, it may be possible to consider the effect, and/or use, of a shadow mask for pixel data. As in practice, the pixel may not be occupying the entire square area in some cases. If there is significant shadow mask in each pixel, it may be desirable to take that into consideration. In such cases, there may be several options to consider: (1) when the pixel location is shifted spatially, it may be possible to align the pixels so that the final rendered pixel may have substantially the same non-masked area in each pixel; (2) it may be possible to design the shadow mask in a different pattern—e.g., so by aligning the pixels at half pixel position, each of the final rendered pixels may have substantially the same non-masked area.

Increasing Temporal Resolution for Dual Modulated Display

The controller of FIG. 2 may—in addition to increasing spatial resolution for a dual modulation display system—also increase the temporal resolution of such a duel modulation display system, for all of the various embodiments of such display systems (e.g., FIGS. 1A-1C).

In one embodiment in which the front and rear layers have substantially the same temporal update rate, it may be possible to use a similar scheme as in previous section to double the temporal update rate of the picture. In such an embodiment, the pixels of front and rear layer may be aligned well, pixel to pixel, but the refreshing time may be offset—e.g., by approximately half the refreshing period in one embodiment. It should be appreciated here that—while this embodiment uses half the refreshing period as temporal displacement for simplicity—it would be possible to extend to any temporal displacement for the two layers.

Figure 6:
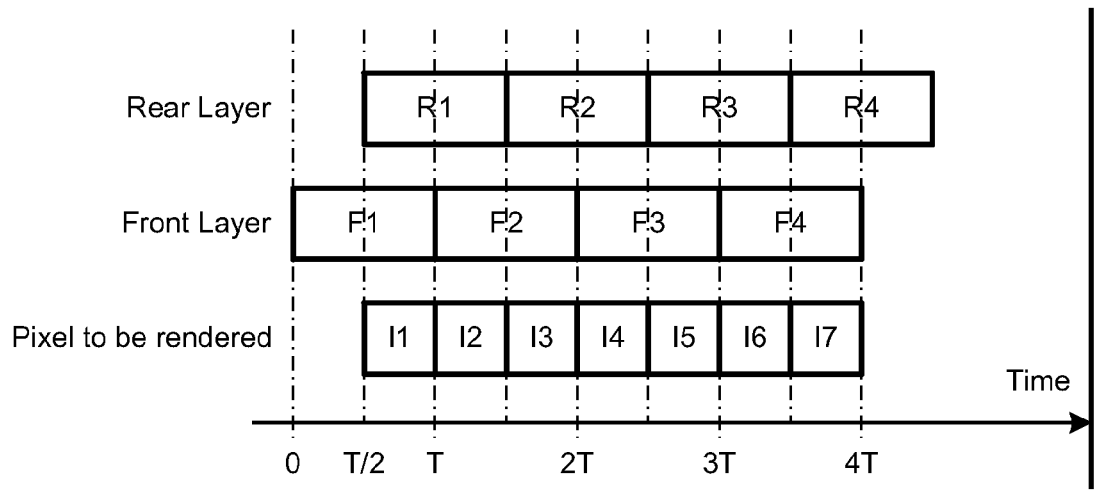
FIG. 6 depicts one embodiment of a mapping of image data for first and second modulators for a temporal offset.

If the refreshing period of both front and rear layer is denoted as "T", then it may be possible to refresh the front layer at time nT, and refresh the rear layer at $nT+\frac{1}{2}T$, where $n=1, 2, 3, \ldots$ as is shown in FIG. 6, where only a single pixel is shown on the time line. The rear layer and the front layer may be refreshed at different time. The final rendered pixel tends to display a temporal resolution that is doubled. For example in the figure, when both rear layer and front layer only shows 4 frames, the final rendered pixel already has shown 7 frames.

Following the method previously described in spatial resolution section, it is possible to render a pixel at a higher refresh rate. For merely one example, if a pixel need to be changed from 0 to 1 at time 2T, i.e., $Ii=0$ for $i<=3$, and $Ii=1$ for $i>3$, it is possible to set $Ri=0$, for $i=1$, $Ri=1$ for $i>1$, $Fi=0$, for $i<=2$, and $Fi=1$ for $i>2$. The change from 0 to 1 of the final rendered pixel may also be rendered at $2T+T/2$, while we set $Ri=0$ for $i<=2$, $Ri=1$ for $i>2$, $Fi=0$ for $i<=2$, and $Fi=1$ for $i>2$.

In one embodiment, these temporal systems/methods/techniques may use entire video as input to solve the temporal values for each frame. In other embodiment, the entire video data may not be needed. For example, as the videos are usually organized as scenes, it may be possible to utilize the scene cut information that exists in the EDL metadata, or an automatic scene detection method to separate the input sequence into small clips, and solve the rear and front layer pixels values for each clip. It may also be possible to use the solution of a previous clip as a constraint to solve a further clip. Alternatively, it may be possible to solve each clip independently.

In one embodiment, it may be desirable to use a buffer to store the frames to be displayed and to use these frames to compute the two layers of pixels. In cases when the frame buffer size is fixed (for example in hardware implementation), it is possible to solve the constrained optimization problem as disclosed herein, to ensure the continuously correctness.

In one embodiment, an overall method for increasing temporal resolution may be described as follows:

1. For given input image sequences:
2. For each pixel:
   a. Obtain a 1D array for pixels across a certain amount of frames
   b. Reorganize the 1D array into a sparse 2D matrix according on FIG. 4.
   c. Assign weights to each element of the matrix
   d. Use non-negative matrix factorization to find out front and rear arrays
3. Packing front arrays into front image sequences.
4. Packing rear arrays into rear image sequences.

Trading Off Between Spatial Resolution and Temporal Resolution:

The capability of using dual modulated display to increase either spatial resolution or temporal resolution make it possible to change the enhancement direction based on the content. Spatial and/or temporal resolution may be dynamically chosen so that the same number of samples may yield more visually perceived information. For a given video, it may be possible to determine a higher frame rate or higher spatial resolution for each group of consecutive frames. In the case of improved and/or enhanced spatial resolution, the dual modulated displays may be set up in a configuration to enhance spatial resolution. In the case of improved and/or enhanced temporal resolution, the dual modulated display may be switched to a different configuration.

In one embodiment of a dual modulation display system, it is possible to extend these dynamic tradeoffs among spatial resolution, temporal resolution, and dynamic range—e.g., so that the dual modulated display may be put into different mode dynamically based on the content or need. Such dynamic configuration may be a user-selectable mode—or, alternatively, may be selected by any application that may be controlling the display system.

Additional Embodiments

The above described spatial and temporal increasing of resolution can be extended in many ways, including various spatially and temporal displacements, and displacements in both spatial and temporal directions. Below are a few example additional embodiments that allow for dual modulation systems to generate higher spatial resolution display capability.

Figure 7A:
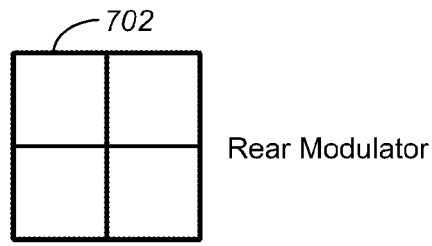
FIGS. 7A-7C depict one embodiment of two high-resolution modulators (FIGS. 7A and 7B) that are stacked together in FIG. 7C.
Figure 7B:
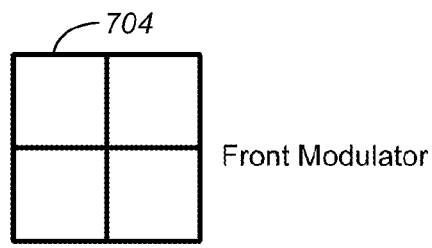
Figure 7C:
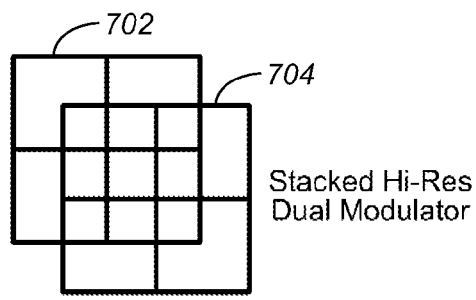

FIGS. 7A-7C show two high-resolution modulators—rear modulator 702 and front modulator 704—that are stacked together in FIG. 7C. It may be seen that that the offset between two or more modulators may be in one or two dimensions—e.g., including the offset along a diagonal as shown in FIG. 7C. When a known offset is used in the alignment of the two modulators, it is possible to drive the individual elements of the two modulators such that they interpolate in between the drive values at native resolution of the display. It should be appreciated that the modulators may be color or monochrome or transparent LCDs or OLEDs or MEMS based digital micro-shutters(DMS).

Figure 8A:
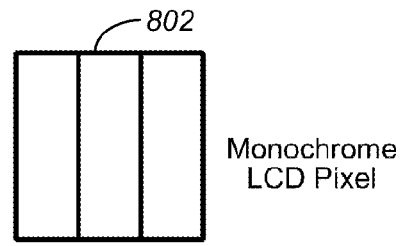
FIGS. 8A-8C depict another embodiment of two high-resolution modulators (FIGS. 8A and 8B) that are stacked together in FIG. 8C.
Figure 8B:
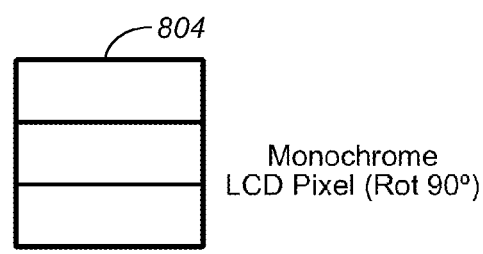
Figure 8C:
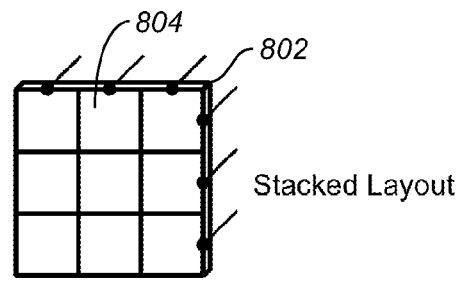

FIGS. 8A-8C depict an embodiment that allows an increase in resolution for a grey scale display. As may be seen, two monochrome LCDs 802 and 804 (e.g., each comprising a plurality of elongated subpixels per pixel) are stacked, but one of them is rotated by 90 degrees such that when perfectly aligned. In this example, it allows for 6 drives to individual subpixels on both LCDs to allow for control of 9 different square subpixels. It should be appreciated that the LCD pixels could be substituted with DMS for faster response times and higher contrast performance.

Figure 9:
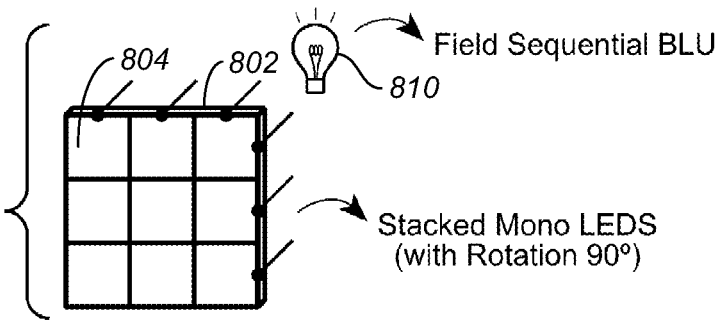
FIG. 9 depicts the embodiment of FIGS. 8A-8C that uses a field sequential backlight.

FIG. 9 depicts the embodiment of FIGS. 8A-8C that uses the stacked monochrome LCDs described with a field sequential backlight to allow for high resolution color display. Such field sequential backlight display systems are discussed further in commonly owned applications as follows:

(1) United States Patent Application 20130063573 to Erinjippurath, published on Mar. 14, 2013 and entitled "HIGH DYNAMIC RANGE DISPLAYS HAVING IMPROVED FIELD SEQUENTIAL PROCESSING";

(2) United States Patent Application 20120044281 to Kang, published on Feb. 23, 2012 and entitled "HIGH DYNAMIC RANGE DISPLAY WITH THREE DIMENSIONAL AND FIELD SEQUENTIAL COLOR SYNTHESIS CONTROL";

(3) United States Patent Application 20110050559 to Seetzen, published on Mar. 3, 2011 and entitled "FIELD SEQUENTIAL DISPLAY OF COLOR IMAGES WITH COLOR SELECTION"

all of which are hereby incorporated by reference in their entirety.

Figure 10:
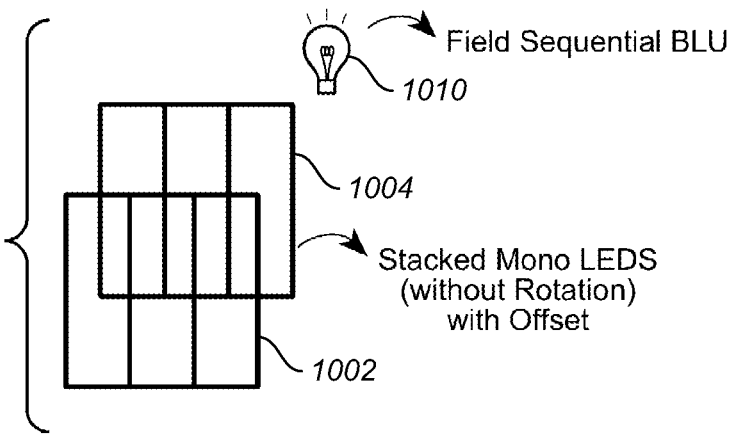
FIG. 10 is an embodiment comprising two modulators that comprise an alternate pixel.

FIG. 10 is an embodiment comprising two modulators 1002, 1004 comprising an alternate pixel layout where the resolution in increased asymmetrically along the horizontal and vertical axes. This configuration may optionally be backlit by a field sequential backlight unit (BLU) 1010.

Figure 11:
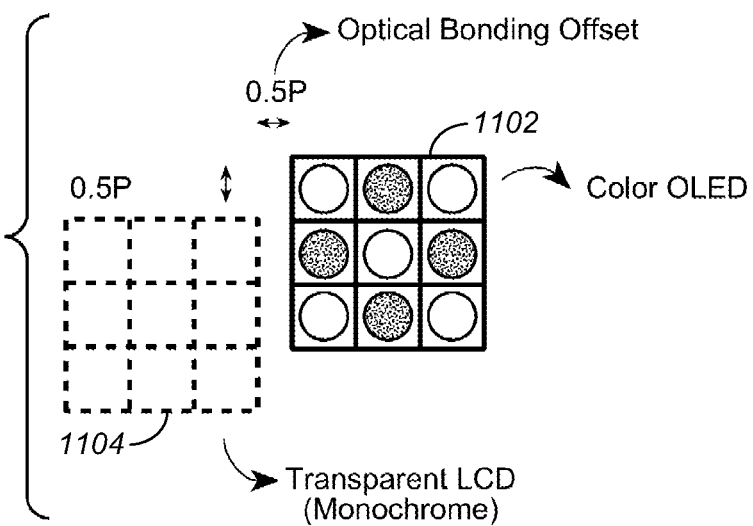
FIG. 11 is an embodiment in which one of the modulators comprises an OLED and the front modulator is a LCD or a DMS array.

FIG. 11 is an embodiment in where the one of the modulators is an active matrix OLED (AMOLED) 1102 and the front modulator is a transparent monochrome LCD or a DMS array 1104. The vertical and horizontal offset can be applied at the time of optical bonding. The use of an OLED backlight is generally described in:

(1) United States Patent Application 20110273377 to Merz, published on Nov. 10, 2011 and entitled "BACKLIGHT FOR A DISPLAY"—which is hereby incorporated by reference in its entirety.

Figure 12:
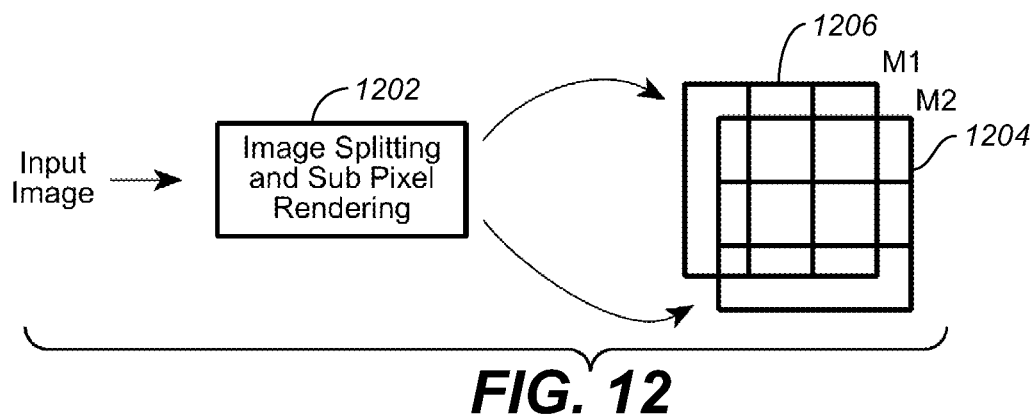
FIG. 12 provides a system level description of a display system that splits an input image with controller into two sub-images and render them onto to two modulators.

FIG. 12 provides a system level description of a display system that splits an input image with controller 1202 into two subimages and renders them, possibly on a sub-pixel rendering basis, onto to the two monochrome modulators described in FIG. 9. As an alternative embodiment, it may be possible to process the field sequential backlight onto two modulators (either being mono, colored, or one mono and the other colored). The techniques of enhanced spatial and/or temporal resolution using such dual modulators may even be applicable with the use of "dynamic virtual primaries" as described in:

(1) United States Patent Application 20090174638 to Brown Elliott et al., published on Jul. 9, 2009 and entitled "HIGH DYNAMIC CONTRAST DISPLAY SYSTEM HAVING MULTIPLE SEGMENTED BACKLIGHT"—which is hereby incorporated by reference.

Figure 13:
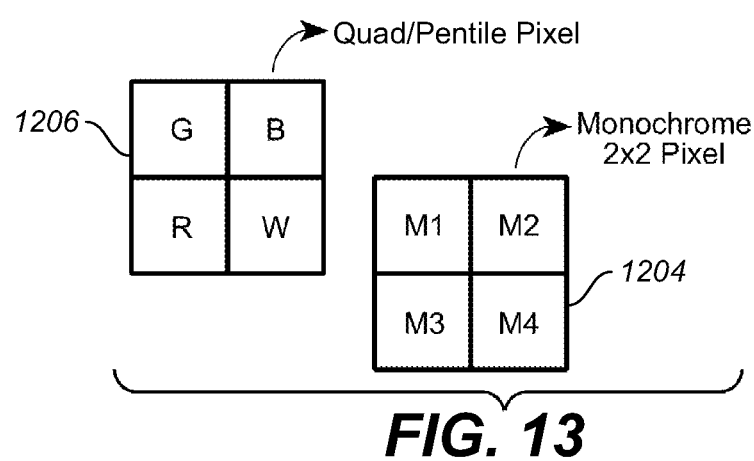
FIG. 13 depicts various embodiments that comprises alternative subpixel layouts.

FIG. 13 shows that the various embodiments disclosed herein may employ any known subpixel layouts 1206 (e.g. a quad or Pentile subpixel layout) in one or both front and back layers (and/or monochrome layout 1204 in one of the layers). Examples of PenTile layouts may be found in:

(1) United States Patent Application 20050225575 to Brown Elliott et al., published on Oct. 13, 2005 and entitled "NOVEL SUBPIXEL LAYOUTS AND ARRANGEMENTS FOR HIGH BRIGHTNESS DISPLAYS"—which is hereby incorporated by reference.

Manufacturing Enhanced Resolution Display Systems

If dual modulation display systems having enhanced resolution in either spatial or temporal dimensions are to be mass produced, then some techniques may be used to aid in their manufacturing.

For example, if spatially enhanced display systems are being manufactured with a first layer being offset from a second layer (whether the layers are constructed as in FIG. 1A, 1B or 1C), then there may be some errors introduced into the proper alignment during manufacture. It may be desirable to make some correction in the controller at final product check out and quality control—so that the display system may perform as if substantially perfectly aligned.

Without knowing a priori what the manufacturing error, it may be possible to supply a test image to render upon the display system that may tend to detect any misalignment in any known direction (e.g., vertical, horizontal, diagonal). Upon rendering a known test image, the resulting rendered image may be captured by some known image capture (e.g., camera, smart device or the like) for analysis. Some testing protocols are disclosed in commonly owned patent applications:

(1) United States Patent Application Number 20120075435 to Hovanky et al., published on Mar. 29, 2012 and entitled "METHOD AND SYSTEM FOR 3D DISPLAY CALIBRATION WITH FEEDBACK DETERMINED BY A CAMERA DEVICE";

(2) United States Patent Application Number 20120074851 to Erinjippurath, published on Mar. 29, 2012 and entitled "METHOD AND SYSTEM FOR DISPLAY CALIBRATION WITH FEEDBACK DETERMINED BY A CAMERA DEVICE";

all of which are incorporated by reference herein by their entirety.

Examples of Spatial and/or Temporal Resolution Enhancement

Figure 14:
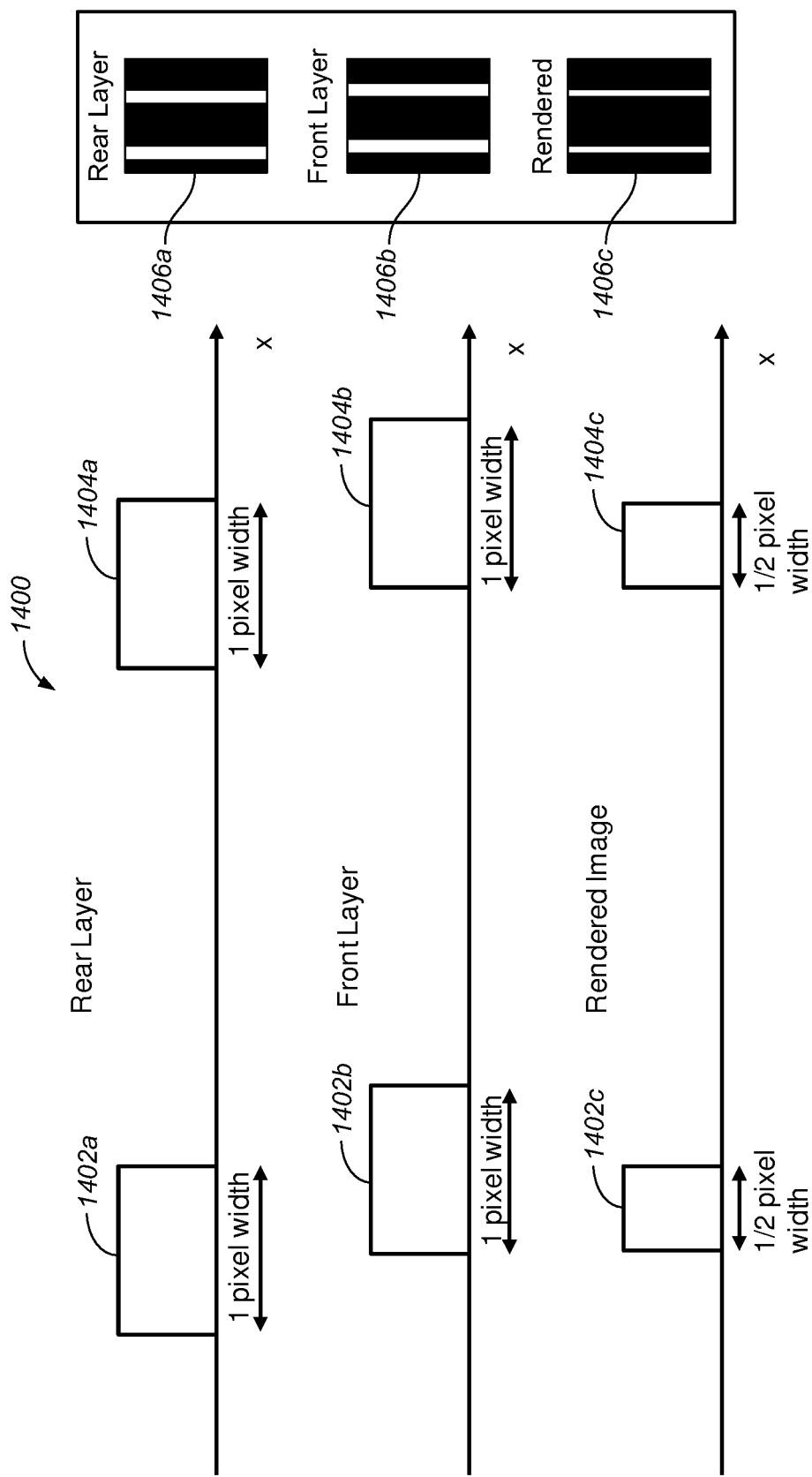
FIGS. 14 and 15 depict in a dynamic fashion examples of spatial and/or temporal processing, respectively.
Figure 15:
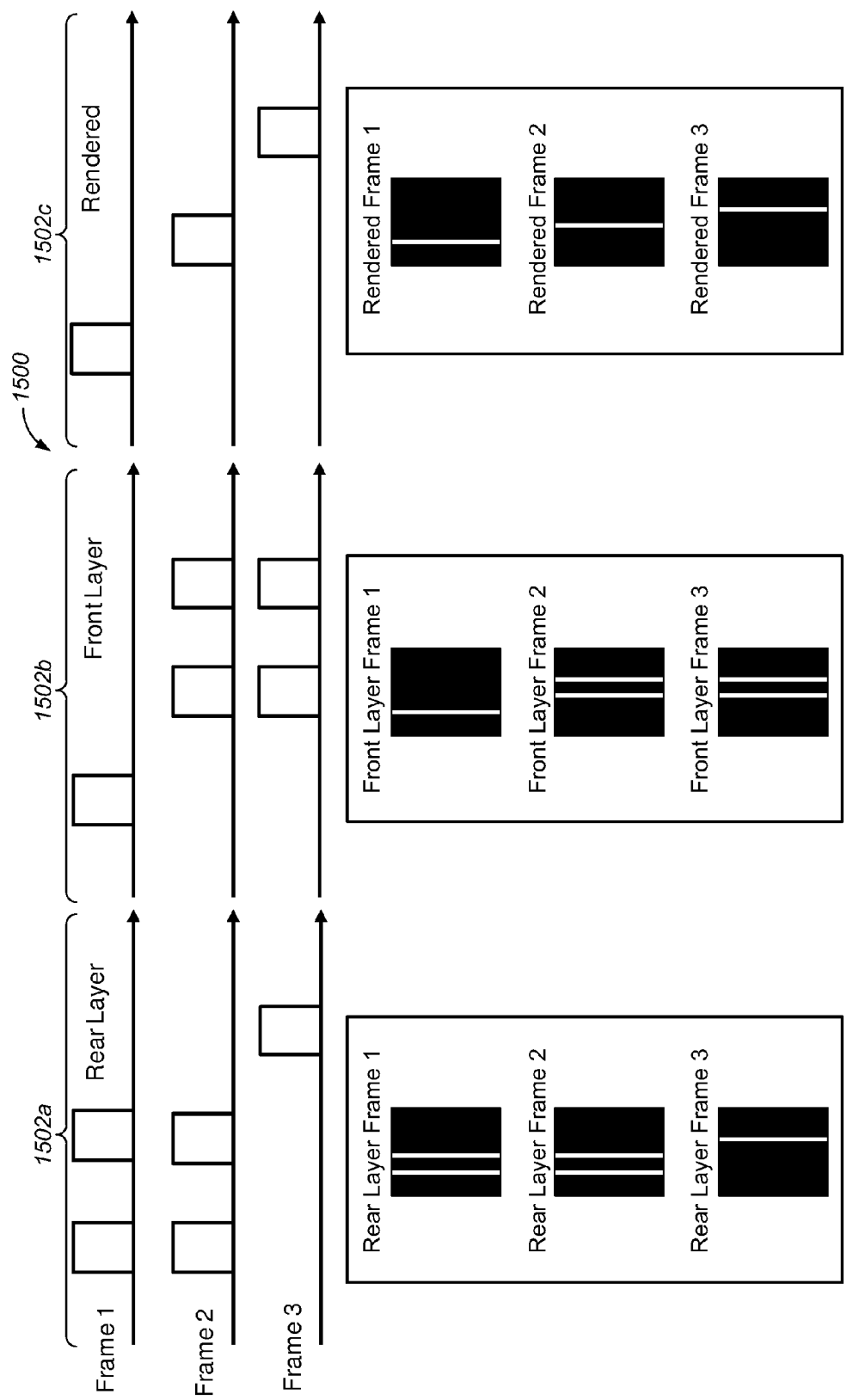

FIGS. 14 and 15 depict in a dynamic fashion examples of spatial and/or temporal enhancement, respectively. FIG. 14 depicts three examples of spatial processing—in which the rear layer exhibits two peaks of illumination 1402a and 1404a—e.g., either emitted by rear layer or transmitted by rear layer at that particular spatial position (e.g. "x") on the display system. At the same time, front layer exhibits two peaks of transmissivity 1402b and 1404b at its particular spatial positions on the display system. The rendered image (e.g., a combination of rear layer and front layer luminosity)

is shown at 1402c and 1404c—e.g., in this case, the rendered image being ½ pixel wide, when presented with the front and rear layer luminosity as depicted. Illumination patterns 1406a, 1406b and 1406c represent the same data as described—as, e.g., might be seen on a frontal view of the display system according to each layer.

FIG. 15 depicts three examples of temporal processing—in which the three exemplary rear layer illuminations 1502a are matched with three exemplary illuminations 1502b. The three rendered images that result are shown in 1502c.

Suitable analysis may be applied—and a set of correction image rendering values may be set within the controller (e.g., perhaps burned into ROM or other storage) at display calibration time, so that proper rendering may be experienced by the end customer/viewer of the display system. Test patterns and frame sequences may be applied to test and/or correct for accurate temporal display system rendering.

Scalable Content-Dependent Processing

As described in the above sections, dual modulation systems may be made to accurately represent higher spatial or temporal resolutions than either of the individual modulators. However, the optimal representation of the imagery will depend on the content that is being displayed. As noted and incorporated by reference above, WO2012/166512 describes a system and methods to determine the optimal spatial and temporal resolution for a particular video sequence based on the motion elements in the scenes described in the sequence. This information can be used to drive the optimization algorithm described above towards enhanced resolution in either the spatial or temporal domain. Such a system is described in FIG. 16.

Figure 16:
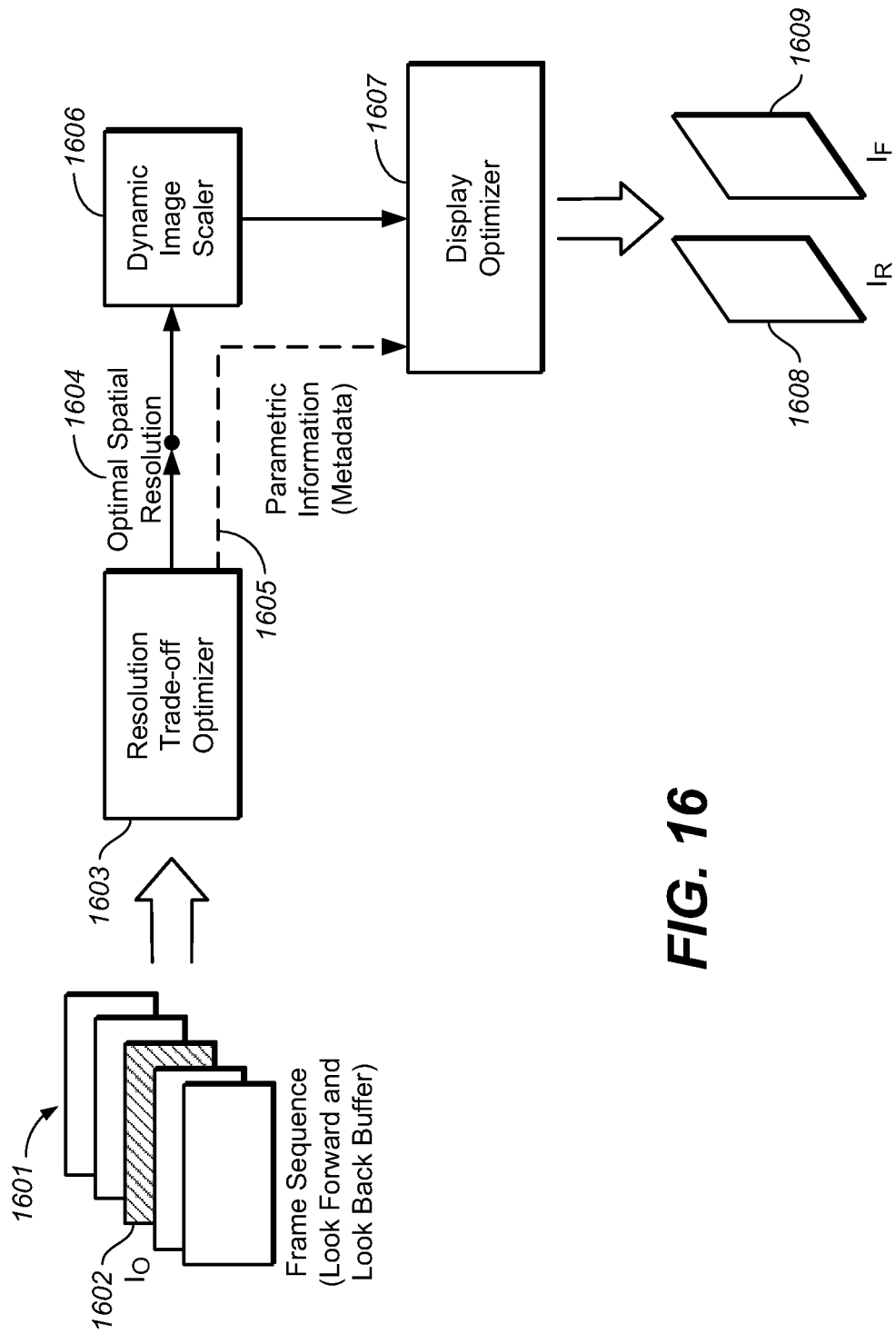
FIG. 16 depicts one embodiment that employs a dynamic optimization algorithm for a video sequence.

FIG. 16 depicts one embodiment that employs such an optimization algorithm. As seen, a sequence of frames 1601 from a video file may be input into the system. Frame 1602 is one particular frame considered by the system in the sequence. These frames could be at a higher or lower spatial resolution compared to the resolution of the modulators. When this frame sequence is run through the Resolution Tradeoff Optimizer 1603, the system may receive an indication of the optimal spatial resolution 1604 and metadata describing the parameters for resolution enhancement 1605. In one example, this metadata may comprise a parameter describing whether the resolution enhancement optimizer will operate in either the spatial domain or the temporal domain. This information may then be used by the dynamic image scaler module 1606—that scales the input image that is provided as input to the Display Optimizer Module 1607 running the display optimization algorithm described above. This module may then generate signals for the dual modulation drives, rear 1608 and front 1609 modulators respectively.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A display system, said display system comprising:
a first modulation layer;
a second modulation layer;
wherein said first modulation layer capable of transmitting a first modulated light to said second modulation layer and wherein further said second modulation layer capable of transmitting a second modulated light;
wherein further said first modulation layer is offset from said second modulation layer by a first distance;
a controller, said controller capable of receiving input image data and sending intermediate signals to said first modulation layer and said second modulation layer; and
said controller capable of mapping said input image data into said intermediate signals as a function of said first distance.

2. The display system of claim 1 wherein said first distance comprises one of a group, said group comprising: a spatial offset between said first modulation layer and said second modulation layer, a rotational offset between said first modulation layer and said second modulation layer, a temporal offset between said first modulation layer and said second modulation layer and a spatial/temporal offset between said first modulation layer and said second modulation layer.

3. The display system of claim 1 wherein said first distance comprises a spatial offset of a half pixel in a desired direction between said first modulator layer and said modulator layer.

4. The display system of claim 1 wherein said first distance comprises a spatial offset of a half pixel in both vertical and horizontal directions between said first modulator layer and said modulator layer.

5. The display system of claim 4 wherein said input image data comprises a first resolution and each of said first modulation layer and said second modulation layer comprises a second resolution.

6. The display system of claim 5 wherein said first resolution comprises substantially 4096×2160 pixel resolution and said second resolution comprises substantially 2048×1080 pixel resolution.

7. The display system of claim 1 wherein said first distance comprises a temporal offset of substantially one half of the refreshing period between said first modulator layer and said modulator layer.

8. The display system of claim 7 wherein the final rendered image is displayed at twice the temporal resolution of said input image data.

9. The display system of claim 1 wherein said first modulator layer and said second modulator layer comprise liquid crystal displays and said display system further comprises a field sequential backlight.

10. The display system of claim 9 wherein said first distance comprises a spatial offset.

11. The display system of claim 9 wherein said first distance comprises a rotational offset.

12. The display system of claim 1 wherein said first modulator layer and said second modulator layer comprise liquid crystal displays and said controller splits said input image data and subpixel renders intermediate signals to said first and said second modulator layers.

13. The display system of claim 12 wherein said subpixel layout of said first modulator layer comprises one of a group, said group comprising: stripe, quad and Pentile subpixel layouts.

14. The display system of claim 1 wherein said first distance comprises one of a group, said group comprising: a spatial offset optimized on a tradeoff of spatial and temporal resolution for a particular frame in a video sequence and a temporal offset optimized on a tradeoff of spatial and temporal resolution for a particular frame in a video sequence.

15. The display system of claim 1 wherein said first modulator layer and said second modulator layer, respectively, are one of a group, said group comprising: a first LCD panel and a second LCD panel, a first DMD and a second DMD, a first digital projector and a second digital projector and a LED array and a LCD panel.

16. A projector, comprising:
   a light source configured to illuminate a first reflective modulator configured to modulate light from the light source and illuminate a second reflective modulator wherein said first reflective modulator is optically offset from said second reflective modulator; and
   a controller configured to receive input image data and send intermediate signals to said first modulation layer and said second modulation layer based on an amount of said offset.

17. The projector according to claim 16, wherein said first and second modulator are replicated for each of a series of color channels within the projector such that each color channel includes 2 optically offset reflective modulators.

18. The projector according to claim 16, wherein series of color channels comprise a red channel, a green channel, and a blue channel.

19. The projector according to claim 16, wherein the light source comprises a plurality of laser light sources.

20. The projector according to any of claim 16, wherein the controller is further configured to energize the modulators according to 3D image data.

\* \* \* \* \*